(12) United States Patent
Nakanishi et al.

(10) Patent No.: US 7,633,817 B2
(45) Date of Patent: Dec. 15, 2009

(54) SEMICONDUCTOR MEMORY DEVICE, CONTROLLER, AND READ/WRITE CONTROL METHOD THEREOF

(75) Inventors: Masahiro Nakanishi, Yawata (JP);
Tomoaki Izumi, Neyagawa (JP);
Tetsushi Kasahara, Katano (JP);
Kazuaki Tamura, Toyono-gun (JP);
Kiminori Matsuno, Katano (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 11/712,387

(22) Filed: Mar. 1, 2007

(65) Prior Publication Data
US 2007/0156948 A1    Jul. 5, 2007

Related U.S. Application Data

(63) Continuation of application No. 10/553,974, filed as application No. PCT/JP2004/01546 on Oct. 13, 2004, now Pat. No. 7,203,105.

(30) Foreign Application Priority Data

Oct. 17, 2003   (JP)   ............................. 2003-357694

(51) Int. Cl.
*G11C 7/00*   (2006.01)
(52) U.S. Cl. .................................. 365/191; 365/230.03
(58) Field of Classification Search .................. 365/191, 365/230.03
See application file for complete search history.

(56) References Cited

U.S. PATENT DOCUMENTS

| | | | |
|---|---|---|---|
| 4,418,394 A | | 11/1983 | Tai |
| 5,572,466 A | * | 11/1996 | Sukegawa ............... 365/185.33 |
| 2007/0214309 A1 | * | 9/2007 | Matsuura et al. ............ 711/103 |

FOREIGN PATENT DOCUMENTS

| | | |
|---|---|---|
| JP | 48-66745 A | 9/1973 |
| JP | 5-020181 A | 1/1993 |
| JP | 6-119128 A | 4/1994 |
| JP | 7-295880 A | 11/1995 |
| JP | 10-187359 A | 7/1998 |

* cited by examiner

*Primary Examiner*—Michael T Tran
(74) *Attorney, Agent, or Firm*—Smith Patent Office

(57) ABSTRACT

A controller 102 and four flash memories F0 to F3 are connected by twos to two memory buses, and each flash memory is divided into two regions of substantially the same size to form a first half and a last half regions. In a four-memory configuration, a consecutive logical address specified by a host apparatus is divided into a predetermined size, and a write operation is performed in a format that repeatedly circulates through F0, F1, F2, F3 in this order. In a two-memory configuration, the write operation is performed in a format that repeatedly circulates through F00, F10, F01, F11. Thus, a controller processing is made common regardless of the number of flash memories connected to the controller.

11 Claims, 6 Drawing Sheets

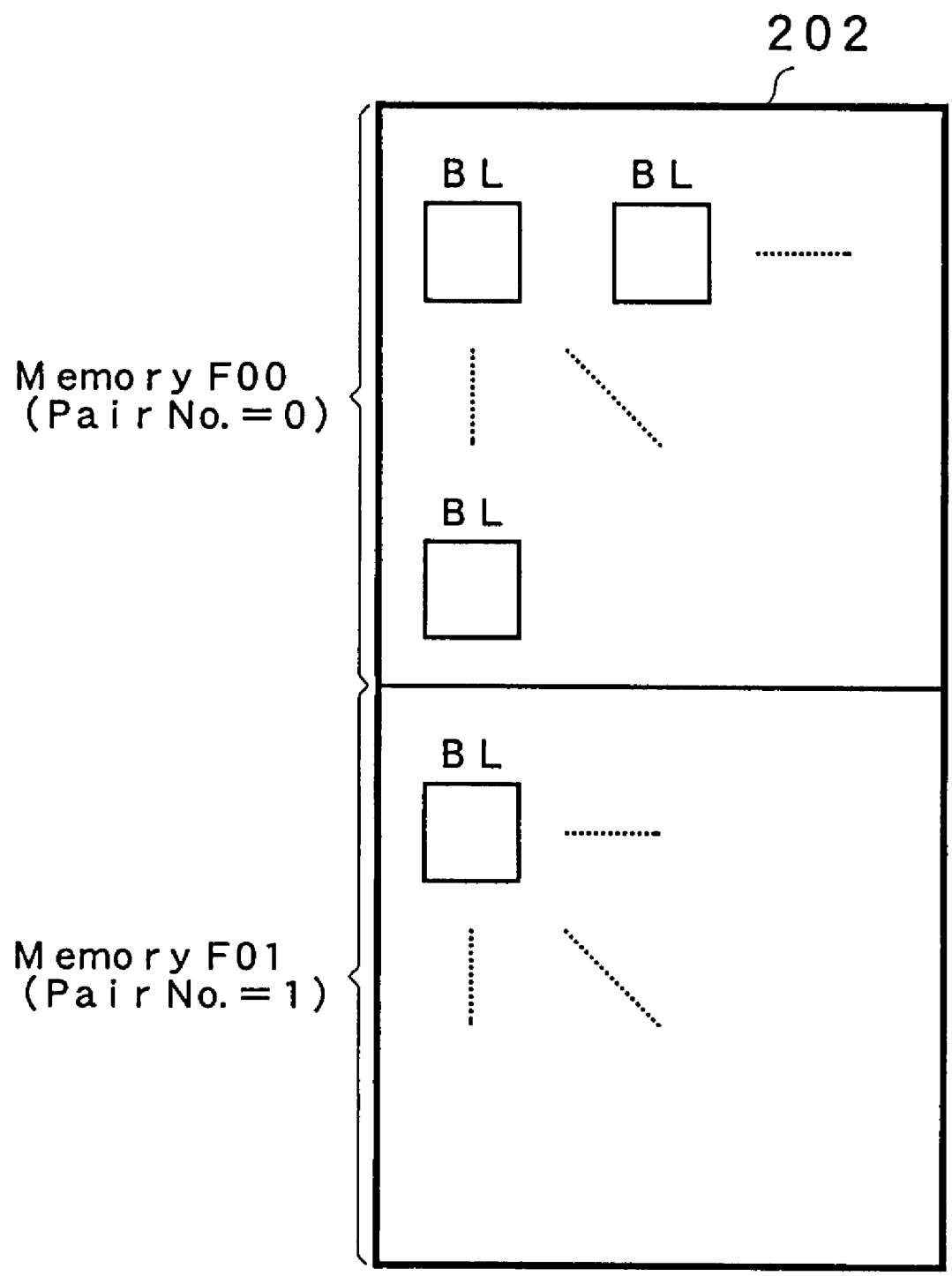
F I G. 3

FIG. 4

| Page No. | | | | |
|---|---|---|---|---|
| 0 | Sector 3 | Sector 2 | Sector 1 | Sector 0 |
| 1 | Sector 3 | Sector 2 | Sector 1 | Sector 0 |
| ⋮ | | ⋮ | | |
| N | Sector 3 | Sector 2 | Sector 1 | Sector 0 |
| ⋮ | | ⋮ | | |
| 127 | Sector 3 | Sector 2 | Sector 1 | Sector 0 |

Page (2KB)

FIG. 6

| (1) L.S. No. | 00 | 01 | 02 | 03 | 04 | 05 | 06 | 07 | 08 | 09 | 10 | 11 |
|---|---|---|---|---|---|---|---|---|---|---|---|---|

2KB-separation

| (2) L.S.M. No. Modulo 4 | 00 | 01 | 02 | 03 | 00 | 01 | 02 | 03 | 00 | 01 | 02 | 03 |
|---|---|---|---|---|---|---|---|---|---|---|---|---|

(3) Writing destination in 4FM: F0 F1 F2 F3 F0 F1 F2 F3 F0 F1 F2 F3

(4) Writing destination in 2FM: F00 F10 F01 F11 F00 F10 F01 F11 F00 F10 F01 F11

SEMICONDUCTOR MEMORY DEVICE, CONTROLLER, AND READ/WRITE CONTROL METHOD THEREOF

CROSS REFERENCE TO RELATED APPLICATIONS

This application is a continuation application of U.S. patent application Ser. No. 10/553,974 filed on Oct. 19, 2005, now U.S. Pat. No. 7,203,105, which was the National Stage of International Application No. PCT/JP2004/015463, filed on Oct. 13, 2004. The disclosures of U.S. patent application Ser. No. 10/553,974 and International Application No. PCT/JP2004/015463 are hereby incorporated by reference.

TECHNICAL FIELD

The present invention relates to a semiconductor memory device using a nonvolatile memory (flash memory) as a semiconductor memory, a controller, and a read/write control method thereof.

BACKGROUND ART

Among the semiconductor memory devices, a memory card such as an SD memory card (registered trademark) and a compact flash (registered trademark) has a feature of being small in size. The memory card is in practical use as a removable memory device of portable equipments such as a digital still camera utilizing the small-sized feature.

The memory card being in practical use has therein a nonvolatile memory (flash memory) and a controller LSI serving as a control circuit thereof. Recently, needs for large-capacity and fast writing on the memory card are increasing. Thus, the memory card is subjected to the following improvement: a nonvolatile memory of a plurality of chips is contained therein and a nonvolatile memory and a controller LSI are connected to each other via a plurality of memory buses, e.g., two memory buses, so that a write operation is performed in parallel. JP-A 06-119128 (1994) discloses one example of the above technique.

However, in the conventional semiconductor memory device, simply changing the mounting number of nonvolatile memories to be comprised in the memory card is not sufficient for actualizing various capacity of memory card of, for example, 256 MB or 512 MB. In other words, there arises a need for switching an address managing process of an internal part of the controller LSI in accordance with the mounting number of nonvolatile memories. Thus, there arise disadvantages that the internal process becomes complicating and that the cost of the controller LSI increases by introducing such mechanism.

In order to solve the above disadvantages, the present invention aims to achieve a controller LSI (hereinafter, simply referred to as a controller) that can be controlled in the same process even in the case of changing the number of nonvolatile memories to be comprised. That is, the present invention aims to accomplish enhancement in versatility of the controller and, as a result, lower the cost of the semiconductor memory device. Specifically, the present invention is based on controlling two nonvolatile memories (flash memories) (four in total) through two buses, respectively. Further, the present invention aims to actualize controller that simplifies an address managing process of the controller, thereby commonly controlling one nonvolatile memory (two in total) through two buses, respectively.

DISCLOSURE OF INVENTION

A semiconductor memory device and a controller of a nonvolatile memory according to the present invention have a feature of controlling a read/write operation for a plurality of nonvolatile memories through a first memory bus and a second memory bus in accordance with a read/write command from a host apparatus.

The following case is referred to as a two-memory configuration: a nonvolatile memory F0 is connected to the first memory bus and a nonvolatile memory F1 is connected to the second memory bus. The following case is referred to as a four-memory configuration: two nonvolatile memories F0, F2 are connected to the first memory bus and two nonvolatile memories F1, F3 are connected to the second memory bus. The present invention allows the selection of two types of memory configuration. When dividing each of the nonvolatile memory into two regions of substantially the same size to form a first half region and a last half region, a sequential number conversion means for converting a consecutive logical address specified by the host apparatus to a logic sequential number of a predetermined size is arranged, and a modulo number generation section for generating a logic sequential modulo number of system of residues of 4 that repeatedly takes the values of 0 to 3 with respect to the logic sequential number are provided in the controller. When a write command is made from the host apparatus to the consecutive logical address, a data write operation is performed in a format that repeatedly circulates through F0, F1, F2, F3 in case of the four-memory configuration, and the data write operation is performed in a format that repeatedly circulates through the first half region of F0, the first half region of F1, the last half region F0, and the last half region F1 in case of the two-memory configuration based on the sequential modulo number.

According to such a configuration, based on a fact that the basic architecture (address managing process) of the controller controls the four-flash memory configuration, each of the memory is divided into two regions in case of the two-flash memory configuration to control virtually as a four-flash memory configuration, and thus the address managing process of the two-memory configuration can be shared with one architecture. In other words, since the address managing process does not need to be individually provided for when the nonvolatile memory (flash memory) is four or two, the cost of the controller as well as the semiconductor memory device is reduced.

BRIEF DESCRIPTION OF DRAWINGS

FIG. 3 is a configuration diagram of F0 when a flash memory used in the semiconductor memory device is a two-flash memory connection.

FIG. 4 is a schematic diagram showing a configuration of a block in the semiconductor memory device.

FIG. 6 is a schematic diagram showing a write sequence of the semiconductor memory device.

BEST MODE FOR CARRYING OUT THE INVENTION

Figure 1:
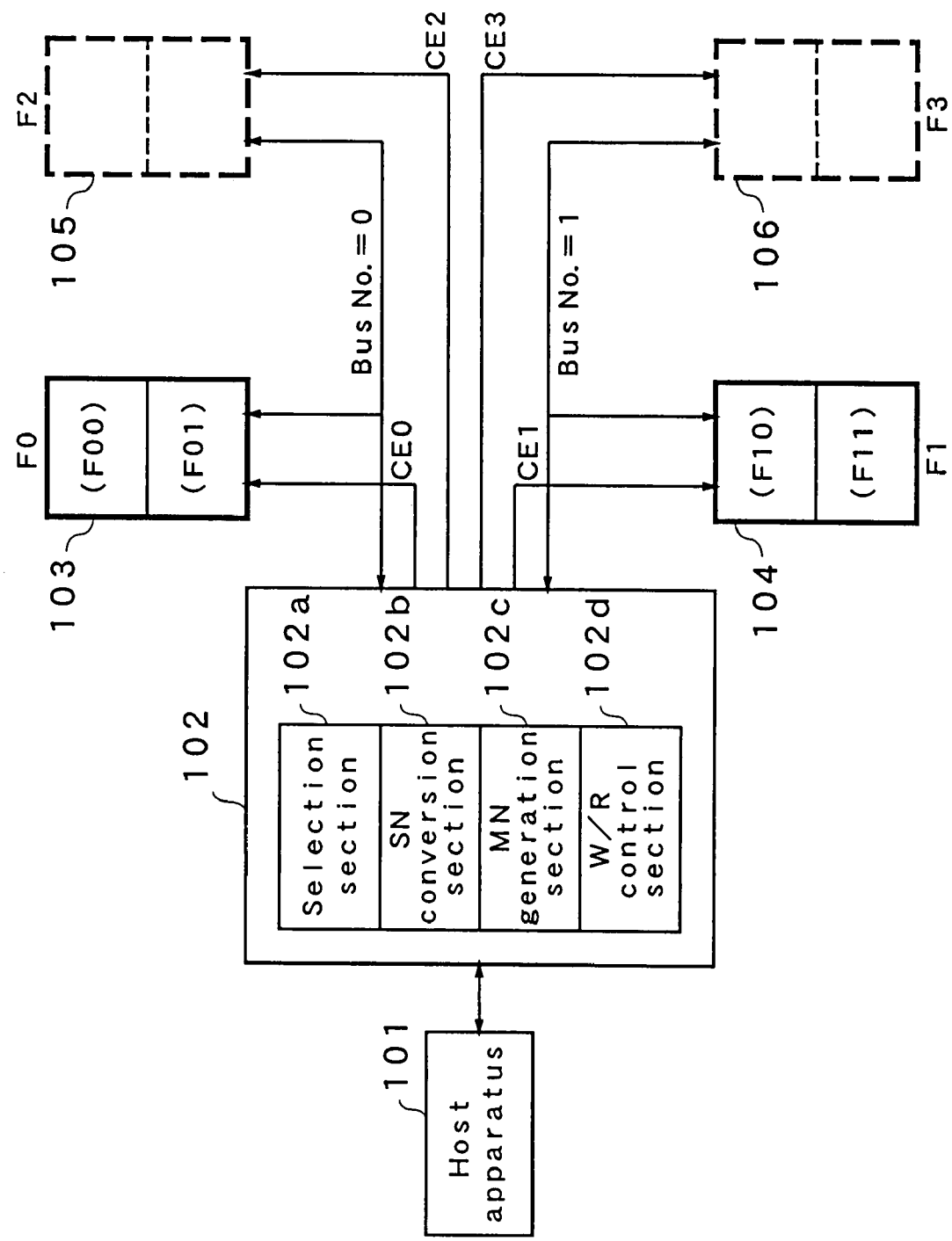
FIG. 1 is a block diagram showing an entire configuration of a semiconductor memory device including a controller according to an embodiment of the present invention.

A semiconductor memory device and a controller thereof according to an embodiment of the present invention will now be described using the drawings. FIG. 1 is a block diagram showing a configuration of the semiconductor memory device according to this embodiment. The semiconductor memory device includes a controller 102 and a plurality of flash memories 103 to 106. Herein, each of the flash memories 103, 104, 105, 106 are sometimes referred to as F0, F1, F2, F3.

The controller 102 converts a logical address into a physical address with respect to a consecutive logical address column transferred in accordance with a data write command or a read command from a host apparatus 101 and performs a data write operation or a data read operation for the four flash memories 103, 104, 105, 106 or the two flash memories 103, 104. Herein, the flash memories 105, 106 are shown with a broken line, indicating that they can be omitted when the nonvolatile memory is a two-flash memory configuration.

Each of the flash memories 103, 104, 105, 106 is independently selected by chip enable signals CE0, CE1, CE2, CE3. Further, the controller 102 and the flash memories 103 to 106 are connected using two memory buses, where the flash memories 103, 105 are connected to the memory bus of bus number 0, and the flash memories 104, 106 are connected to the memory bus of bus number 1.

The controller 102 controls the data write operation or the data read operation for the nonvolatile memory, but functionally includes a selection section 102a, a sequential number conversion section (SN conversion section) 102b, a modulo number generation section (MN generation section) 102c, and read/write control section (W/R control section) 102d.

The selection section 102a determines whether the flash memory is a two-memory configuration or a four-memory configuration, and selects either one. Specifically, in the initialization process immediately after power start up, the selection section 102a checks whether each terminal for sending the chip enable signals CE0, CE1, CE2, CE3 at the controller 102 is connected to the flash memory or not, that is, whether opened or not, to determine the number of the mounted flash memory. The SN conversion section 102b converts a logical address specified by the host apparatus 101 to a logic sequential number for every predetermined size. The MN generation section 102c generates a logic sequential modulo number constituting a system of residues of 4 that repeats the values of 0 to 3 with respect to the logic sequential number. The W/R control section 102d, based on the logic sequential modulo number, performs a data write operation in a format that selectively and repeatedly circulates through F0, F1, F2, F3 in the four-memory configuration, and performs the data write operation in a format that selectively and repeatedly circulates through the first half region of F0, the first half region of F1, the last half region of F0, and the last half region of F1 in the two-memory configuration, when the data write operation for a consecutive logical address is commanded from the host apparatus 101. Further, the W/R control section 102d reads the data requested for access in accordance with the memory configuration. The controller 102 with such functions specifically includes a microcomputer, RAM and the like, and is configured by the peripheral devices, software and the like.

Figure 2:
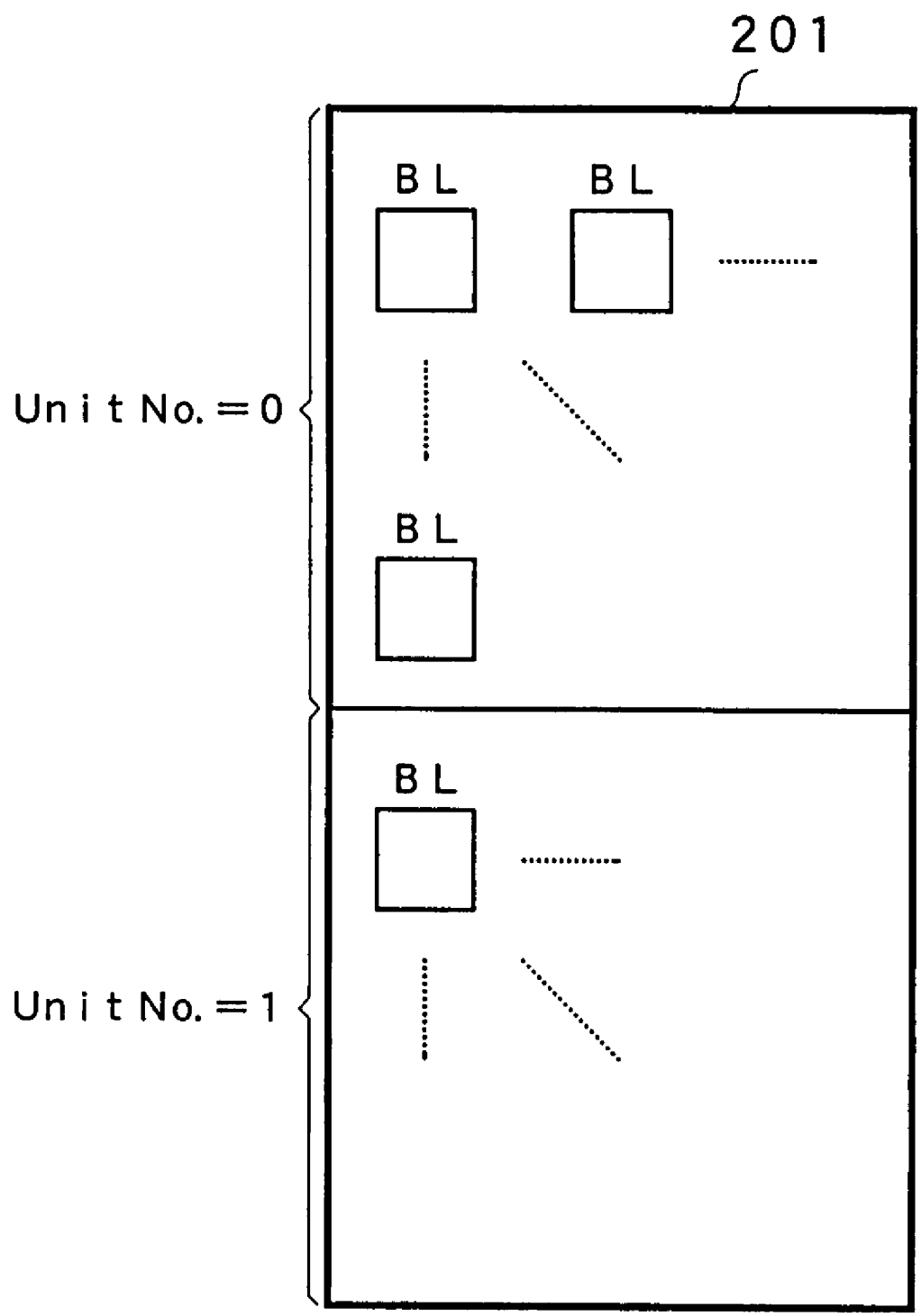
FIG. 2 is a configuration diagram of F0 when a flash memory used in the semiconductor memory device is a four-flash memory connection.

FIGS. 2 and 3 show an internal configuration of one flash memory. 201 shown in FIG. 2 is a frame format of the flash memory 103 in the four-flash memory configuration. On the other hand, 202 shown in FIG. 3 is a frame format of the flash memory 103 in the two-flash memory configuration. Other flash memories, that is, the flash memories 104, 105, 106 also have a configuration similar to the flash memory 103 in the four-flash memory configuration. In the two-flash memory configuration, the flash memory 104 also has a configuration similar to the flash memory 103.

The flash memory in the four-memory configuration is divided into two regions, that is, into unit numbers 0 and 1 and controlled. The flash memory in the two-memory configuration is divided into two virtual flash memories, that is, memory F00 and F01 and controlled. Each flash memory is handled by being divided into a plurality of block (BL) units as shown in the figure.

FIG. 4 is an internal configuration diagram of a block acting as an erase unit which corresponds to each block (BL) shown in FIGS. 2 and 3. The data write unit is one page (2 KB). Each page consists of four sectors, that is, sectors 0 to 3. Each sector has a capacity of 512 B. One block consists of 128 pages (pages 0 to 127). Here, the managing region of each sector and each page is omitted for the sake of simplifying the explanation.

Figure 5:
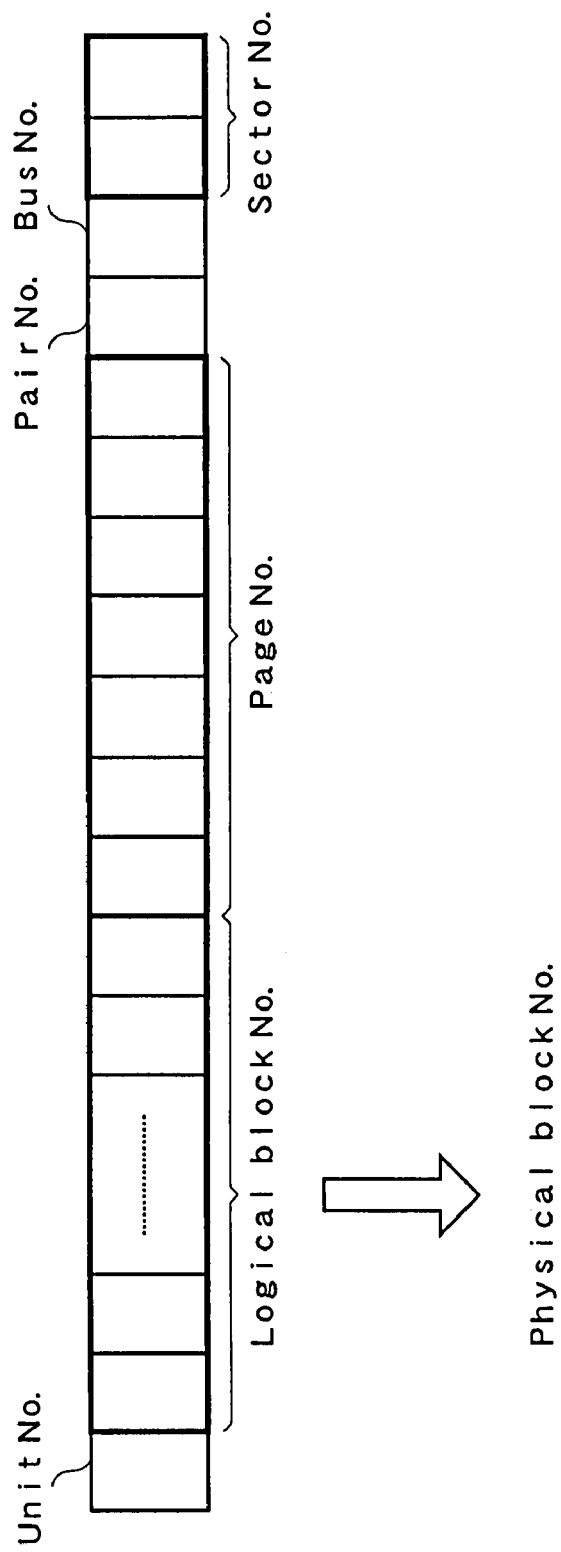
FIG. 5 is a schematic diagram showing a configuration example of a logical address format in the semiconductor memory device.

FIG. 5 is an explanatory diagram showing a logical address format. As shown in FIG. 5, the logical address format includes a unit No. of one bit, a logical block No. of a predetermined number of bits, a page No. of seven bits, a pair No. of one bit, a bus No. of one bit, and a sector No. of two bits.

The sector No. is represented as bits for selecting one of the sectors 0 to 3 shown in FIG. 4. The bus No. is a bit for selecting one of the two memory buses as shown in FIG. 1. The pair No. is a bit for selecting the combination of flash memories. In the four-memory configuration, selection is made either a pair of flash memories 103, 104 or a pair of flash memories 105, 106. In the two-memory configuration, selection is made either a pair of first half regions (F00, F10 shown in FIG. 1) of the flash memories 103, 104, or a pair of last half regions (F01, F11 shown in FIG. 1) of the flash memories 103, 104. For instance, when the value of the pair No. is 0, an access is made to the group of flash memories 103, 104 in the four-memory configuration. In the two-memory configuration, an access is made to the group of each of the first half regions (F00, F10) of the flash memories 103, 104. On the other hand, when the value of the pair No. is 1, an access is made to the group of flash memories 105, 106 in the four-memory configuration. In the two-memory configuration, an access is made to the group of each of the last half regions (F01, F11) of the flash memories 103, 104.

The page No. is represented as bits for selecting only one of the total number of pages (128 pages) per one block shown in FIG. 4. The logic block No. is a region of a half of each flash memory, that is, a logic block No. per unit No. 0 or unit No. 1 in 201 of FIG. 2 or a logic block number per F00 or F01 in 202 of FIG. 3, and consists of a predetermined number of bits. The logic block No. is converted into the physical block No. by a logical-physical address conversion table in the controller 102 and then the selection of the block is performed. The logical-physical address conversion table is a table used in converting the logical address to the physical address based on a predetermined rule.

The unit No. is represented as a bit used in the four-memory configuration, and is a bit for selecting the first half and the last half of the flash memory, as shown in 201 of FIG. 2. With the two bits of the pair No. and the bus No., one of the four flash memories 103 to 106 can be specified in the four-memory configuration, and one of the four virtual flash memories of F00, F01, F10, F11 can be specified in the two-memory configuration.

The above-mentioned logical address format is merely one example, and the number of bits or the array may, needless to say, be changed depending on the configuration or the architecture of the flash memory.

FIG. 6 is a timing chart showing to which flash memory (or region) the data is to be written in accordance with the consecutive logical address column (hereinafter, referred to as the logic sequential No.) transferred in response to the data write command from the host apparatus 101.

The operation of the semiconductor memory device according to this embodiment will now be explained focusing around FIG. 6. In (1) of FIG. 6, the logic sequential No. (L.S.No.) is transferred from the host apparatus 101 to the controller 102 with the data write command. The logic sequential No. is in numerical order for every 2 KB (corresponding to the page size acting as the write unit), which the number is incremented so that the bit of the bus No. in the logical address format shown in FIG. 5 is in the increment position. The controller 102 performs the data write operation for each flash memory while incrementing the bit position as the starting point in page units.

The logic sequential No. is converted into the system of residuals of 4 that takes the value of 0 to 3 as shown in (2) of FIG. 6, or only the lower 2 bits are retrieved and provided for the selection of the flash memory as the logic sequential modulo No. (L.S.M.No.). That is, the pair No. and the bus No. are incremented so as to be 0, 1, 2, 3 in which 4 refers to 0, 5 refers to 1, or 00, 01, 10, 11 in 2 bit representation. In FIG. 6, the flash memories 103, 104, 105 and 106 are represented as F0, F1, F2 and F3, respectively.

Therefore, in the four-flash memory configuration (4FM), the pair No. takes the value 0 in the flash memories F0, F1; thus, the write order, as shown in (3) of FIG. 6, is repeated by rotation of F0, F1, F2, and F3. On the other hand, in the two-flash memory configuration (2FM), the pair No. takes the value 0 when using the first half region F00 of the flash memory F0 or the first half region F10 of the flash memory F1; thus, the write order, as shown in (4) of FIG. 6, is repeated by rotation of F00, F10, F01, and F11. Herein, the start of the data write operation may be other than from F0 or F00. By dividing the flash memory into two logic regions that are substantially equal and simply changing the definition of pair No., the write address management of the four-flash memory configuration or the two-flash memory configuration can be performed using the same address process, that is, the logical address format shown in FIG. 5.

In this embodiment, the logical address range is divided into two with respect to the entire region of one flash memory, but for example, may be divided into eight regions of regions 0 to 7, where the first half regions 0 to 3, and the last half regions 4 to 7 are grouped so that the pair No. becomes 0 and 1, respectively.

INDUSTRIAL APPLICABILITY

The semiconductor memory device according to the present invention is very effective in changing the card capacity by changing the number of nonvolatile memory to be contained in particular in a large capacity nonvolatile memory (flash memory), that is, in memory card and the like in which it is more rational to divide and manage the region since the number of blocks is great. Further, the controller of the present invention accomplishes the function of the semiconductor memory device with an arbitrary capacity by being added to the memory module in which the nonvolatile memory of a plurality of chips is contained.

The invention claimed is:

1. A semiconductor memory device for recording data based on a signal, comprising:
    a plurality of recording areas in which the data are recorded;
    a controller which receives the signal including address information and controls recording the data in the recording areas; and
    a plurality of buses for connecting said controller with the recording areas;
    wherein a plurality of groups respectively includes selected recording areas from the recording areas connected with each bus,
    said address information includes bus information for identifying a bus and group information for identifying a group, and
    said controller determines a starting recording area and an order of the recording areas where the data are to be recorded and records the data based on the order.

2. The semiconductor memory device according to claim 1, wherein
    the recording area is composed of a nonvolatile memory.

3. The semiconductor memory device according to claim 1, wherein
    the controller includes a selection section for determining the number of the recording areas.

4. The semiconductor memory device according to claim 1, wherein
    the recording area is handled by a block which is a unit of erasing data.

5. The semiconductor memory device according to claim 1, wherein
    the controller determines the order of the recording areas where the data are to be recorded, based on the address information and the number of the recording areas.

6. The semiconductor memory device according to claim 1, wherein
    the recording area is a division of a nonvolatile memory that is divided into a plurality of areas.

7. The semiconductor memory device according to claim 5, wherein
    information regarding the number of the recording areas is the system of residues of the number of the recording areas.

8. The semiconductor memory device according to claim 1, wherein
    the controller independently and respectively controls the recording areas.

9. A controller for controlling recording data in recording areas based on a signal, comprising:
    a reception section for receiving the signal;
    a selection section for determining the number of the recording areas connected with the controller;
    a generation section for determining a starting recording area and an order of the recording areas where the data are to be recorded;
    a control section for controlling recording the data based on the order; and
    a plurality of buses for connecting the recording areas with the controller,
    wherein said generation section determines an order of the recording areas where the data are to be recorded, based on address information including bus information for identifying a bus and group information for identifying a group, and
    the group includes selected recording areas from the recording areas connected with each bus.

10. The controller according to claim 9, wherein
a plurality of buses connects the recording areas with the controller, and
the recording areas are independently controlled via the bus.

11. A data recording system for recording data in a semiconductor memory device, comprising:
a host device for transmitting a signal to the semiconductor memory device; and
a semiconductor memory device for recording the data based on the signal, wherein
the semiconductor memory device includes:
a plurality of recording areas in which the data are recorded;
a controller which receives the signal including address information and controls recording the data in the recording areas; and
a plurality of buses for connecting said controller with the recording areas;
wherein a plurality of groups respectively includes selected recording areas from the recording areas connected with each bus,
said address information includes bus information for identifying a bus and group information for identifying a group, and
said controller determines a starting recording area and an order of the recording areas where the data are to be recorded and records the data based on the order.

* * * * *